US008955024B2

(12) United States Patent
Nilsson et al.

(10) Patent No.: US 8,955,024 B2
(45) Date of Patent: Feb. 10, 2015

(54) VIDEO STREAMING

(75) Inventors: Michael E Nilsson, Ipswich (GB); Rory S Turnbull, Woodbridge (GB); Ian B Crabtree, Ipswich (GB); Stephen C Appleby, Colchester (GB); Patrick J Mulroy, Vizcaya (ES)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 13/201,261

(22) PCT Filed: Feb. 5, 2010

(86) PCT No.: PCT/GB2010/000217
§ 371 (c)(1),
(2), (4) Date: Aug. 12, 2011

(87) PCT Pub. No.: WO2010/092327
PCT Pub. Date: Aug. 19, 2010

(65) Prior Publication Data
US 2011/0296485 A1 Dec. 1, 2011

(30) Foreign Application Priority Data
Feb. 12, 2009 (EP) .................................... 09250346

(51) Int. Cl.
*H04N 7/173* (2011.01)
*H04L 12/54* (2013.01)
(Continued)

(52) U.S. Cl.
CPC ............ *H04L 12/5695* (2013.01); *H04L 47/10* (2013.01); *H04L 47/38* (2013.01); *H04L 47/801* (2013.01); *H04L 47/822* (2013.01); *H04L 47/826* (2013.01)
USPC .................. 725/114; 725/90; 725/95; 725/96

(58) Field of Classification Search
None
See application file for complete search history.

(56) References Cited

U.S. PATENT DOCUMENTS

| 4,419,699 A | 12/1983 | Christopher et al. |
| 5,025,458 A | 6/1991 | Casper et al. |

(Continued)

FOREIGN PATENT DOCUMENTS

| CN | 1426235 | 6/2003 |
| CN | 1714577 A | 12/2005 |

(Continued)

OTHER PUBLICATIONS

International Search Report (3 pgs.) dated Nov. 17, 2010 issued in International Application No. PCT/GB2010/000217.

(Continued)

*Primary Examiner* — Brian T Pendleton
*Assistant Examiner* — Jean D Saint Cyr
(74) *Attorney, Agent, or Firm* — Nixon & Vanderhye P.C.

(57) ABSTRACT

A video sequence is to be transmitted at a selectable quality from a server over a network. A network control protocol operates in response to a control parameter to allocate to the server a share of available transmission capacity in proportion to the value of the control parameter. First, one determines a plurality of transmission rate values that are needed over successive time periods of the sequence for successful transmission of the sequence at a reference quality; then the control parameter is set, proportional to the transmission rate value and communicated to the control protocol at corresponding time instants. The sequences can then be transmitted, encoded at a quality from time to time selected in dependence upon the actual transmission capacity made available by the network to the server.

10 Claims, 5 Drawing Sheets

(51) Int. Cl.
*H04L 12/801* (2013.01)
*H04L 12/811* (2013.01)
*H04L 12/927* (2013.01)
*H04L 12/911* (2013.01)

(56) References Cited

U.S. PATENT DOCUMENTS

| | | | |
|---|---|---|---|
| 5,430,485 | A | 7/1995 | Lankford et al. |
| 5,534,937 | A | 7/1996 | Zhu et al. |
| 5,598,352 | A | 1/1997 | Rosenau et al. |
| 5,612,900 | A | 3/1997 | Azadegan et al. |
| 5,640,208 | A | 6/1997 | Fujinami |
| 5,768,527 | A | 6/1998 | Zhu et al. |
| 5,874,997 | A | 2/1999 | Haigh |
| 5,923,655 | A | 7/1999 | Veschi et al. |
| 5,949,410 | A | 9/1999 | Fung |
| 5,953,350 | A | 9/1999 | Higgins |
| 5,991,811 | A | 11/1999 | Ueno et al. |
| 6,002,440 | A | 12/1999 | Dalby et al. |
| 6,014,694 | A | 1/2000 | Aharoni et al. |
| 6,016,307 | A | 1/2000 | Kaplan et al. |
| 6,085,221 | A | 7/2000 | Graf |
| 6,097,757 | A | 8/2000 | Boice et al. |
| 6,101,221 | A | 8/2000 | Varanasi et al. |
| 6,130,987 | A | 10/2000 | Tanaka |
| 6,148,135 | A | 11/2000 | Suzuki |
| 6,169,843 | B1 | 1/2001 | Lenihan et al. |
| 6,195,368 | B1 | 2/2001 | Gratacap |
| 6,223,211 | B1 | 4/2001 | Hamilton et al. |
| 6,259,733 | B1 | 7/2001 | Kaye et al. |
| 6,332,157 | B1 | 12/2001 | Mighdoll et al. |
| 6,366,614 | B1 | 4/2002 | Pian et al. |
| 6,366,705 | B1 | 4/2002 | Chiu et al. |
| 6,381,254 | B1 | 4/2002 | Mori et al. |
| 6,397,251 | B1 | 5/2002 | Graf |
| 6,438,317 | B1 | 8/2002 | Imahashi et al. |
| 6,452,922 | B1 | 9/2002 | Ho |
| 6,453,112 | B2 | 9/2002 | Imahashi et al. |
| 6,502,125 | B1 | 12/2002 | Kenner et al. |
| 6,522,693 | B1 | 2/2003 | Lu et al. |
| 6,529,631 | B1 | 3/2003 | Peterson et al. |
| 6,560,334 | B1 | 5/2003 | Mullaney et al. |
| 6,678,332 | B1 | 1/2004 | Gardere et al. |
| 6,704,288 | B1 | 3/2004 | Dziekan et al. |
| 6,771,703 | B1 | 8/2004 | Oguz et al. |
| 6,792,047 | B1 | 9/2004 | Bixby et al. |
| 6,931,071 | B2 | 8/2005 | Haddad et al. |
| 6,937,770 | B1 | 8/2005 | Oguz et al. |
| 6,976,208 | B1 | 12/2005 | Kim et al. |
| 7,016,970 | B2 | 3/2006 | Harumoto et al. |
| 7,062,088 | B1 | 6/2006 | Clauson |
| 7,082,167 | B2 | 7/2006 | Alexandre et al. |
| 7,096,481 | B1 | 8/2006 | Forecast et al. |
| 7,111,061 | B2 | 9/2006 | Leighton et al. |
| 7,328,150 | B2 | 2/2008 | Chen et al. |
| 7,333,721 | B2 | 2/2008 | Maehashi et al. |
| 7,340,505 | B2 | 3/2008 | Lisiecki et al. |
| 7,430,329 | B1 | 9/2008 | Sarna |
| 7,471,874 | B2 | 12/2008 | Kanemaru et al. |
| 7,558,869 | B2 | 7/2009 | Leon et al. |
| 7,620,137 | B2 | 11/2009 | Lottis et al. |
| 7,676,107 | B2 | 3/2010 | Gordon |
| 7,760,801 | B2 | 7/2010 | Ghanbari et al. |
| 8,064,470 | B2 | 11/2011 | Alvarez Arevalo et al. |
| 8,125,901 | B2 | 2/2012 | Appleby et al. |
| 2001/0025308 | A1 | 9/2001 | Jinushi et al. |
| 2002/0031120 | A1 | 3/2002 | Rakib |
| 2002/0090027 | A1 | 7/2002 | Karczewicz et al. |
| 2002/0100052 | A1 | 7/2002 | Daniels |
| 2002/0102978 | A1 | 8/2002 | Yahagi |
| 2002/0136205 | A1 | 9/2002 | Sasaki |
| 2003/0002482 | A1 | 1/2003 | Kubler et al. |
| 2003/0053416 | A1 | 3/2003 | Ribas-Corbera et al. |
| 2003/0145007 | A1 | 7/2003 | Kenner et al. |
| 2003/0169777 | A1 | 9/2003 | Fuse |
| 2003/0233666 | A1 | 12/2003 | Onomatsu et al. |
| 2004/0098748 | A1* | 5/2004 | Bo et al. ............ 725/105 |
| 2004/0141731 | A1 | 7/2004 | Ishioka et al. |
| 2005/0021830 | A1* | 1/2005 | Urzaiz et al. ........ 709/234 |
| 2005/0028133 | A1 | 2/2005 | Ananth et al. |
| 2005/0071876 | A1 | 3/2005 | van Beek |
| 2005/0117891 | A1 | 6/2005 | Suzuki |
| 2005/0175251 | A1 | 8/2005 | Taketa et al. |
| 2005/0286422 | A1* | 12/2005 | Funato ............... 370/235 |
| 2005/0286631 | A1 | 12/2005 | Wu et al. |
| 2006/0067362 | A1 | 3/2006 | Ramakrishnan |
| 2006/0092836 | A1 | 5/2006 | Kwan et al. |
| 2006/0120290 | A1 | 6/2006 | Della Torre et al. |
| 2006/0224762 | A1 | 10/2006 | Tian et al. |
| 2006/0238445 | A1 | 10/2006 | Wang et al. |
| 2007/0009045 | A1 | 1/2007 | Mohandas |
| 2008/0304413 | A1 | 12/2008 | Briscoe et al. |
| 2009/0074084 | A1* | 3/2009 | Drezner et al. ........ 375/240.29 |
| 2009/0086816 | A1 | 4/2009 | Leontaris et al. |
| 2010/0034272 | A1 | 2/2010 | Miyazaki et al. |
| 2010/0061446 | A1 | 3/2010 | Hands et al. |
| 2010/0157121 | A1* | 6/2010 | Tay ................... 348/294 |
| 2011/0019738 | A1 | 1/2011 | Nilsson et al. |
| 2011/0243223 | A1 | 10/2011 | Nilsson et al. |

FOREIGN PATENT DOCUMENTS

| | | |
|---|---|---|
| DE | 10125017 A1 | 12/2002 |
| EP | 0 703 711 | 3/1996 |
| EP | 0817488 A2 | 1/1998 |
| EP | 0868084 A1 | 9/1998 |
| EP | 0966175 A2 | 12/1999 |
| EP | 1 296 479 | 3/2003 |
| EP | 1 919 220 | 5/2008 |
| WO | WO 95/22233 | 8/1995 |
| WO | 96/35999 | 11/1996 |
| WO | WO 98/26604 | 6/1998 |
| WO | WO 99/05602 | 2/1999 |
| WO | WO 99/65026 | 12/1999 |
| WO | WO 01/89142 A2 | 11/2001 |
| WO | WO 02/49343 A1 | 6/2002 |
| WO | WO 02/095637 A2 | 11/2002 |
| WO | WO 03/084172 | 10/2003 |
| WO | WO 2004/047455 | 6/2004 |
| WO | WO 2004/054274 | 6/2004 |
| WO | 2006/099082 | 9/2006 |
| WO | WO 2008/081185 | 7/2008 |
| WO | WO 2008/119954 | 10/2008 |
| WO | WO 2010/092323 | 8/2010 |

OTHER PUBLICATIONS

Crabtree B. et al., "Equitable Quality Video Streaming", Consumer Communications and Networking Conference, 2009, CCNC 2009, 6th IEEE, Piscataway, NJ, Jan. 10, 2009, pp. 1-5.
International Search Report for PCT/GB2010/000217, mailed Nov. 17, 2010.
Crabtree, B. et al., "Equitable Quality Video Streaming", Consumer Communications and Networking Conference, 2009, (Jan. 10, 2009), pp. 1-5.
International Search Report for PCT/GB2009/002827, mailed Apr. 9, 2010.
"Differentiated End-to-End Internet Services using a Weighted Proportional Fair Sharing TCP", by Crowcroft and Oechslin, ACM SIGCOMM, vol. 28, pp. 53-69, Jul. 1998.
"Multiple bitstream switching for video streaming in monotonically decreasing rate schedules", by Alam, Khan and Ghanbari IEEE International Conference on Industrial Technology 2006, Dec. 15-17, 2006, pp. 973-978.
Methodology for the subjective assessment of the quality of television pictures, International Telecommunications Union recommendation B.T.500-11, 2002 (48 pgs.).
Mulroy, P. et al.. "The Use of MULTCP for the Delivery of Equitable Quality Video", BT Innovate, Broadband Applications Research Centre, Ipswich, UK, 2009 (9 pgs.).
International Search Report for PCT/GB2008/000010, mailed Jul. 8, 2008.

(56) References Cited

OTHER PUBLICATIONS

Written Opinion for PCT/GB2008/000010, mailed Jul. 8, 2008.
H.264/AVC, EBU Technical Review, Jan. 2003, R. Schafer, T. Wiegand, and H. Schwarz, available from: http://www.ebu.ch/en/technical/trev/trev_293-schaefer.pdf.
Office Action (14 pgs.) dated Jan. 28, 2014 issued in co-pending U.S. Appl. No. 13/133,757.
Office Action (15 pgs.) dated Feb. 19, 2013 issued in co-pending U.S. Appl. No. 12/921,538.
Office Action (17 pgs.) dated Oct. 11, 2013 issued in co-pending U.S. Appl. No. 12/921,538.
International Search Report for PCT/GB2009/000543, mailed May 8, 2009.
Furini et al., "Real-Time Traffic Transmissions over the Internet", IEEE Transactions on Multimedia, vol. 3, No. 1, Mar. 2001, pp. 33-40, XP002273256.
Chang et al., "Dynamic Window-based Traffic-Smoothing for Optimal Delivery of Online VBR Media Streams", Parallel and Distributed Systems, 2000, Los Alamitos, CA, USA, IEEE Comput.Soc. US, Jul. 4, 2000, pp. 127-134, XP010150439l.
Assuncao et al., "Transcoding of Single-Layer MPEG Video Into Lower Rates", IEE Proceedings;Vision, Image and Signal Processing, Institution of Electrical Engineers, GB, vol. 144, No. 6, Dec. 19, 1997, pp. 377-383, XP006009073.
Karczewicz et al:, "The SP- and SI-Frames Design for H.264/AVC", IEEE Transactions on Circuits and Systems for Video Technology, IEEE Inc., New York, US, vol. 13, No. 7, Jul. 2003, pp. 637-644, XP001051192.
Braden et al, "Resource ReSerVation Protocol (RSVP)", Network Working Group, Request for Comments: 2205, Category: Standards Track, Sep. 1997 (112 pages).
Ng, "A Reserved Bandwidth Video Smoothing Algorithm for MPEG Transmission", The Journal of Systems and Software 48 (1999), pp. 233-245.
Salehi et al., "Supporting Stored Video: Reducing Rate Variability and End-to-End Resource Requirements through Optimal Smoothing", Technical Report: UM-CS-1995-098, University of Massachusetts 1995, 26 pages.
International Search Report mailed Mar. 11, 2004 in International Application No. PCT/GB03/04996 (2 pages).
Karczewicz et al, "SP-Frame Demonstrations", document VCEG-N42, ITU-T Video Coding Experts Group Meeting, Santa Barbara, CA, USA, Sep. 24-27, 2001 (4 pages).
Wu et al, "Streaming Video Over Internet: Approaches and Directions", IEEE Transactions on Circuits and Systems for Video Technology, vol. 11, No. 3, Mar. 2001, pp. 282-300.
Conklin et al., "Video Coding for Streaming Media Delivery on the Internet", IEEE Transactions on Circuits and Systems for Video Technology, vol. 11, No. 3, Mar. 2001, pp. 269-281.
Jammeh et al., "Transporting Real Time Transcoded Video over Internet Using End to End Control", PV2002, Apr. 2002 (10 pages).
Cai et al., "Rate-Reduction Transcoding Design for Video Streaming Applications", PV 2002, Apr. 2002 (10 pages).
Rejaie et al, "Layered Quality Adaptation for Internet Video Streaming", IEEE Journal on Selected Areas in Communications, vol. 18, No. 12, Dec. 2000, pp. 2530-2543.
Feamster et al, "On the Interaction Between Layered Quality Adaptation and Congestion Control for Streaming Video", PV2001, Apr. 2001 (10 pages).
Licandro et al, A Rate/Quality Controlled MPEG Video Transmission System in a TCP-Friendly Internet Scenario, PV 2002, Apr. 2002 (12 pages).
Blake et al., "An Architecture for Differentiated Services", in RFC-2475, Dec. 1998 (33 pages).
Braden et al, "Integrated Service in Internet Architecture: An Overview", in RFC-1633, Jun. 1994 (30 pages).
Mitzel et al, "A Study of Reservation Dynamics in Integrated Services Packet Networks", in Proceedings of the Conference on Computer Communications (IEEE INFOCOM 1996), p. 871-879, Mar. 1996.
Foster et al., "A Quality of Service Architecture that Combines Resource Reservation and Application Adaptation", IWQOS2000, Jun. 2000 (8 pages).
Active IETF Working Groups, Nov. 20, 2006, http://www.ietf.org/html.charters/wg-dir.html#TransportArea, 11 pages.
Differentiated Services (diffserv), http://www.ietf.org/html.charters/diffserv-charter.html, Sep. 9, 2009, 3 pages.
Multiprotocol Label Switching (mpls), http://www.ietf.org/html.charters/mpls-charter.html, Mar. 24, 2006, 4 pages.
Resource Reservation Setup Protocol (rsvp), http://www.ietf.org/html.charters/rsvp-charter.html, Mar. 30, 2001, 2 pages.
Integrated Services (intserv), http://www.ietf.org/html.charters/intserv-charter.html, Sep. 5, 2000, 3 pages.
Lu et al., "Understanding Video Qaulity and its Use in Feedback Control", PV 2002, Pittsburgh, Pennsylvania, USA, Apr. 24-26, 2002, pp. 1-12.
Yang et al., "Rate Control for VBR Video over ATM: Simplification and Implementation", IEEE Transactions on Circuits and Systems for Video Technology, vol. 11, No. 9, Sep. 2001, pp. 1045-1058.
Reed et al., "Constrained Bit-Rate control for Very Low Bit-Rate Streaming-Video Applications", IEEE Transaction on Circuits and Systems for Video Technology, vol. 11, No. 7, Jul. 2001 (8 pages).
International Search Report for PCT/GB2008/001069 mailed Nov. 4, 2008, 3 pages.
Written Opinion for PCT/GB2008/001069 mailed Nov. 4, 2008, 6 pages.
UK Search Report dated Aug. 9, 2007 in GB0706424.9, 1 page.
Zhou et al., "Analysis of a Bandwidth Allocation Strategy for Proportional Streaming Services," E-Commerce Technology, 2004, CEC 2004, Proceedings, IEEE International Conference in San Diego, CA, USA Jul. 6-9, 2004, Piscataway, NJ, USA, ISBN 0-7695-2098-7, XP010714145, pp. 373-376.
Balakrishnan, H., Devadas, S., Ehlert, D. and Arvind, "Rate Guarantees and Overload Protection in Input Queued Switches," INFOCOM 2004, Twenty-third AnnualJoint Conference of the IEEE Computer and Communications Societies Hong Kong, PR China Mar. 7-11, 2004, Piscataway, NJ USA, INFOCOM 2004, Twenty-third AnnualJoint Conference of the IEEE, vol. 4, ISBN 0-7803-8355-9, XP010740588, pp. 2185-2195.
International Search Report, Appln. No. PCT/GB2004/003331, dated Sep. 28, 2004, 7 pages.
UK Search Report, Appln. No. GB 0319251.5, dated Dec. 16, 2003, 3 pages.
International Search Report dated May 20, 2005 in International Application No. PCT/GB2005/001011 (5 pages).
UK Search Report dated Aug. 3, 2004 in Application No. GB 0406901.9 (1 page).
Lu et al, "An Efficient Communication Scheme for Media On-Demand Services with Hard QoS Guarantees", Journal of Network and Computer Applications, 'Online!, vol. 21, No. 1, Jan. 1998, XP002328926, pp. 1-15.
Yeom et al, "An Efficient Transmission Mechanism for Stored Video", Protocols for Multimedia Systems—Multimedia Networking, 1997, Proceedings, IEEE Conference on Santiago, Chile Nov. 24-27, 1997, Los Alamitos, CA, USA, IEEE Comput. Soc., US, Nov. 24, 1997, XP010258820, pp. 122-130.
McManus et al., "Video-On-Demand Over ATM: Constant-Rate Transmission and Transport", IEEE Journal on Selected Areas in Communications, IEEE Inc., New York, US, vol. 14, No. 6, Aug. 1, 1996, XP000608049, pp. 1087-1098.
Office Action dated May 22, 2009 issued in corresponding Chinese Application No. 200580009650.1 with an at least partial English-language translation thereof (11 pages).
English-language translation of Notice of Reasons for Rejection dated Apr. 1, 2010, issued in corresponding Japanese Application No. 2007-504458, 2 pages.
English-language translation of Decision of Rejection dated Dec. 20, 2010 issued in corresponding Japanese Application No. 2007-504458 (6 pages).
Office Action issued in European Appln. No. 05718057.2, dated Oct. 18, 2007 (5 pages).
International Search Report re PCT/GB2004/001253 mailed Sep. 15, 2004 (search conducted Sep. 8, 2004) (8 pages).

(56) References Cited

OTHER PUBLICATIONS

Hwang, et al., "ITU-T Recommendation H.261 Video Coder-Decoder," 1997, Digital Consumer Electronics Handbook, XX, XX, I, XP001059410, pp. 1001-1026.

Anastasiadis, et al., "Server-Based Smoothing of Variable Bit-Rate Streams," ACM Multimedia, 2001, pp. 147-158.

Zimmermann, et al., "A Multi-Threshold Online Smoothing Technique for Variable Rate Multimedia Streams," Multimedia Tools and Applications, vol. 28, Issue 1, Jan. 2006, pp. 23-49, (Abstract only) (1 page).

Mohan, et al., "Adapting Multimedia Internet Content for Universal Access," IEEE Transactions on Multimedia, vol. 1, No. 1, Mar. 1999, pp. 104-114.

Makaroff, et al., "An Evaluation of VBR Disk Admission Algorithms for Continuous Media File Servers," Proc. of ACM Multimedia '97, Seattle, Washington (1997) (8 pages).

Ely et al., "Robust Congestion Signaling," International Conference on Network Protocols 2001 Institute of Electrical and Electronics Engineers Computer Society US, Nov. 11, 2001, pp. 332-341.

Spring et al., "Robust Explicit Congestion Notification (ECN) Signaling with Nonces," University of Washington, Jun. 1, 2003, 13 pages.

Ramakrishnan et al., TeraOptic Networks, "The Addition of Explicit Congestion Notification (ECN) to IP," IETF Standard, Internet Engineering Task Force, Sep. 1, 2001, 63 pages.

International Search Report published Dec. 23, 2010 in International Application No. PCT/GB2010/000163 (4 pages).

Office Action (22 pgs.) dated Aug. 15, 2014 issued in co-pending U.S. Appl. No. 13/133,757.

\* cited by examiner

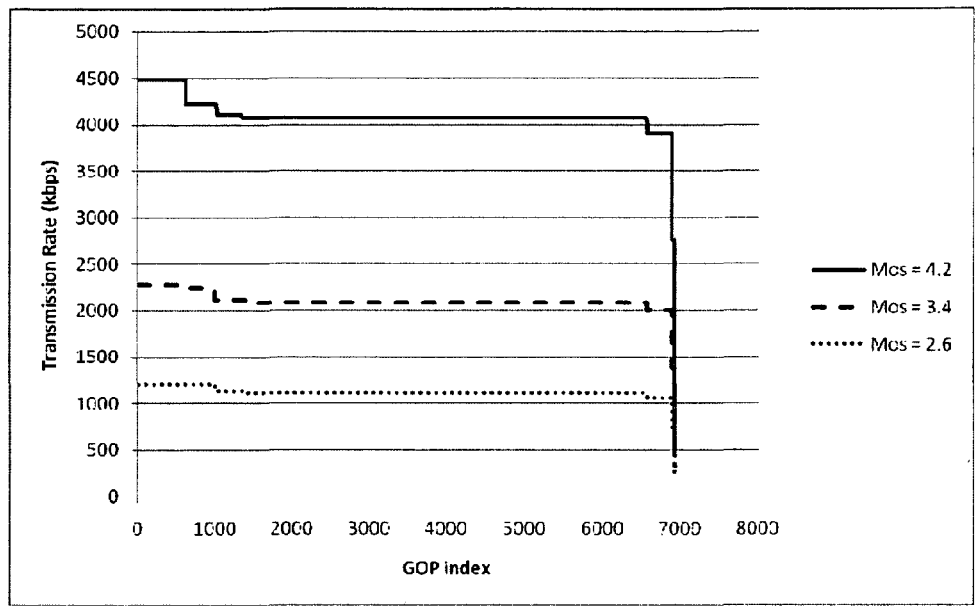
Figure 5. The downstairs bit rate curves for a video sequence coded three times at the constant quality levels 2.6, 3.4, and 4.2.
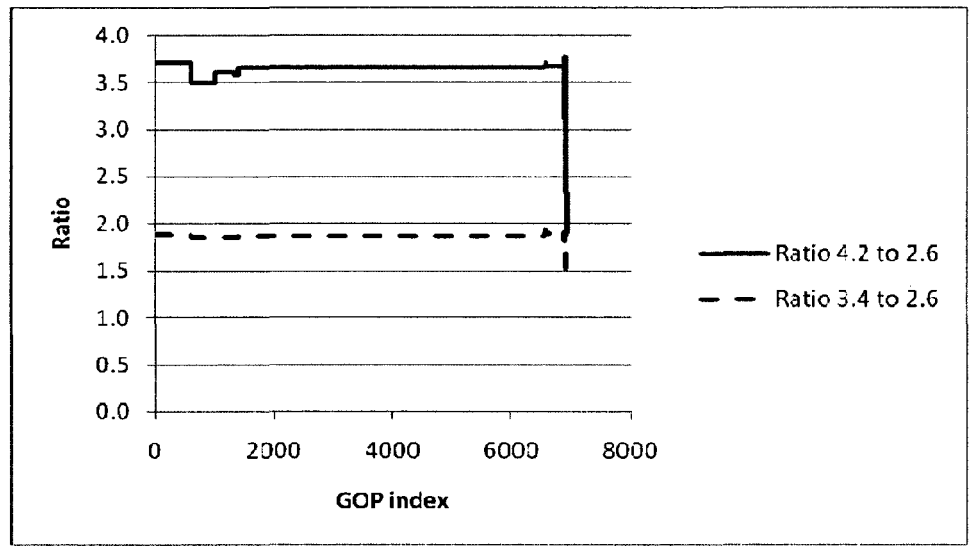
Figure 6. The ratio of the downstairs bit rates at qualities of 2.6 and 4.2 compared to the downstairs bit rates at quality 3.4.

VIDEO STREAMING

This application is the U.S. national phase of International Application No. PCT/GB2010/000217 filed 5 Feb. 2010, which designated the U.S. and claims priority to EP Application No. 09250346.5 filed 12 Feb. 2009, the entire contents of each of which are hereby incorporated by reference.

FIELD OF THE INVENTION

The present invention relates to the transmission of video signals over telecommunications networks.

BACKGROUND TO THE INVENTION

Transmission of video over data networks, such as the Internet, is commonplace today. To receive such signals, a user can use a suitably configured computer or other receiver such as a "set top box" (STB). STBs have become increasingly popular and many are provided with an IP connection allowing content such as video to be streamed or downloaded over the Internet. Television delivered over the Internet, commonly referred to as IPTV, is a good example of this growing service.

When streaming video data over an IP network, there are no guarantees that the data sent will reach its destination. When the network experiences congestion and other problems, delays will occur to the transmission of the data packets and some packets may even be lost.

To provide more reliable end-to-end delivery of data, the transmission control protocol (TCP) is often used as the transport protocol. Indeed, it is quite common to use TCP in video streaming systems for a number of reasons, but primarily because TCP provides mechanisms for ensuring reliable delivery, and managing network congestion. For example, one way in which TCP achieves reliability is by obliging the receiver to acknowledge to the sender all data received. If a packet of data remains unacknowledged after a predetermined period of time, TCP assumes the packet was not received and the same packet is retransmitted by the sender. One way that TCP manages congestion is by reducing the transmission rate of data as a function of congestion in the network.

Take the scenario where a number of video streams are being delivered using TCP and all share a contended piece of network. When congestion occurs, the TCP congestion control algorithm will force all the streams to back off their delivery rate to allow the congestion to clear. Each stream backs off by a fixed factor and eventually all streams will stabilise at approximately the same bandwidth (assuming a similar round trip time).

Use of such a method is not without problems. If the bandwidth becomes less than that required by the video content, play-out of the video could be stalled until sufficient data has been received to restart play-out. This situation can be mitigated by buffering data at the receiver having previously received it faster than necessary for play-out, and by switching the quality of the video transmitted, so that the required bandwidth is reduced to less than or equal to that now provided by the network.

Rate-adaptive, variable bit rate, video streams, where the transmitted video quality or bit rate is adapted over time, are also sometimes delivered over TCP. However, the above congestion scenario may still occur, and two streams each having a different average encoded bitrate for the same video quaity will still stabilise to roughly the same reduced transmission bitrate when the network is congested. This may result in some particularly undesirable results where, a first stream is initially encoded at a high bitrate, for example a video sequence with high frame activity such as a sports sequence, and a second sequence is encoded at a low bit rate, for example a video sequence with a low frame activity such as a news or drama sequence.

When congestion is experienced in the network, TCP will cut the available bandwidth for both streams to roughly the same level. This will affect the first stream, which was encoded at a higher bitrate and thus has a higher bandwidth requirement, more than the second stream, which was encoded at a lower bitrate and thus may still have enough bandwidth. Put another way, the first, high bitrate, stream will be more significantly affected than the second, low bitrate stream, as the first stream is given the same reduced bandwidth as the second stream. This will cause the quality of the video delivered to each user to vary over time, and the quality to vary from user to user depending on the type of video clip they are viewing.

Another way of streaming video that mitigates some of these problems experienced under TCP is to use a constant bitrate delivery system where the bitrate available to a video stream is fixed, for example by a reservation scheme, before the transmission of data starts. This method of delivery is easier to manage, but is not without its problems.

Again, take the example of the two video streams above, where we have a first stream that has very active frames such as a sports clip, and a second stream with less active frames such as a news clip. The bitrates reserved and used to deliver the two streams are fixed at a predetermined rate (that is considered to be sufficient for most applications and in this case for both streams). However, the second stream will not actually require that much bandwidth as the bitrate of the encoding can be much lower than that of the first sequence given that the activity in the second sequence is much less. The second stream transmitted using this fixed bandwidth is thus wasting much of its bandwidth. If the second stream increases the encoding rate so as to utilise the entire bandwidth reserved, the quality of the resulting video is likely to be of a lot higher quality than the first stream. However, this increase in quality may not necessarily be significant as perceived by the viewer and may thus be wasted. Moreover, having this redundant bandwidth is not an efficient use of network resources.

The problems above are heightened when one starts considering video sequences that vary in activity during the sequence itself. For example a relatively static news reading sequence might be interspersed with highlights of very active football clips.

International patent WO2008/119954 describes a method of delivering video streams over a contended network, where each stream delivered at a constant quality.

International patent WO2004/047455 describes a method of delivering a variable bit rate sequence over a network at a piecewise constant bit rate, with the rate of each piece decreasing monotonically. The resulting bit rate profile is referred to as a "downstairs" function.

U.S. Pat. No. B1-6,259,733 describes a method for statistical multiplexing, where multiple video sources are encoded at the same time and multiplexed into a single channel for transmission. The video sources are analysed for spatial and temporal complexity to get a relative need of bit rate, which is scaled according to an importance factor (high for movies, low for news for example), and which is then used to divide up the bandwidth.

US patent application 2006/224762 describes a method of estimating an encoding complexity for video sequences, and using that estimated encoding complexity to determine a bit rate for encoding.

SUMMARY OF THE INVENTION

According to the invention there is provided a method of transmitting a video sequence at a selectable quality from a server over a network, wherein the server operates a network control protocol operable in response to a control parameter to allocate to the server a share of available transmission capacity in proportion to the value of the control parameter, comprising determining a plurality of transmission rate values needed over successive time periods of the sequence for successful transmission of the sequence at a reference quality;

setting the control parameter proportional to the transmission rate value;

sending the control parameter to the control protocol at corresponding time instants;

transmitting video, encoded at a quality from time to time selected in dependence upon the actual transmission capacity made available by the network to the server.

Other aspects of the invention are set out in the claims.

BRIEF DESCRIPTION OF THE DRAWINGS

For a better understanding of the present invention reference will now be made by way of example only to the accompanying drawings, in which:

FIG. 5 is a graph showing downstairs bit rate curves for a video sequence coded three times at the constant quality levels 2.6, 3.4, and 4.2.

FIG. 6 is a graph showing the ratio of the downstairs bit rates at qualities of 2.6 and 4.2 compared to the downstairs bit rates at quality 3.4.

DESCRIPTION OF THE PREFERRED EMBODIMENTS

Figure 1:
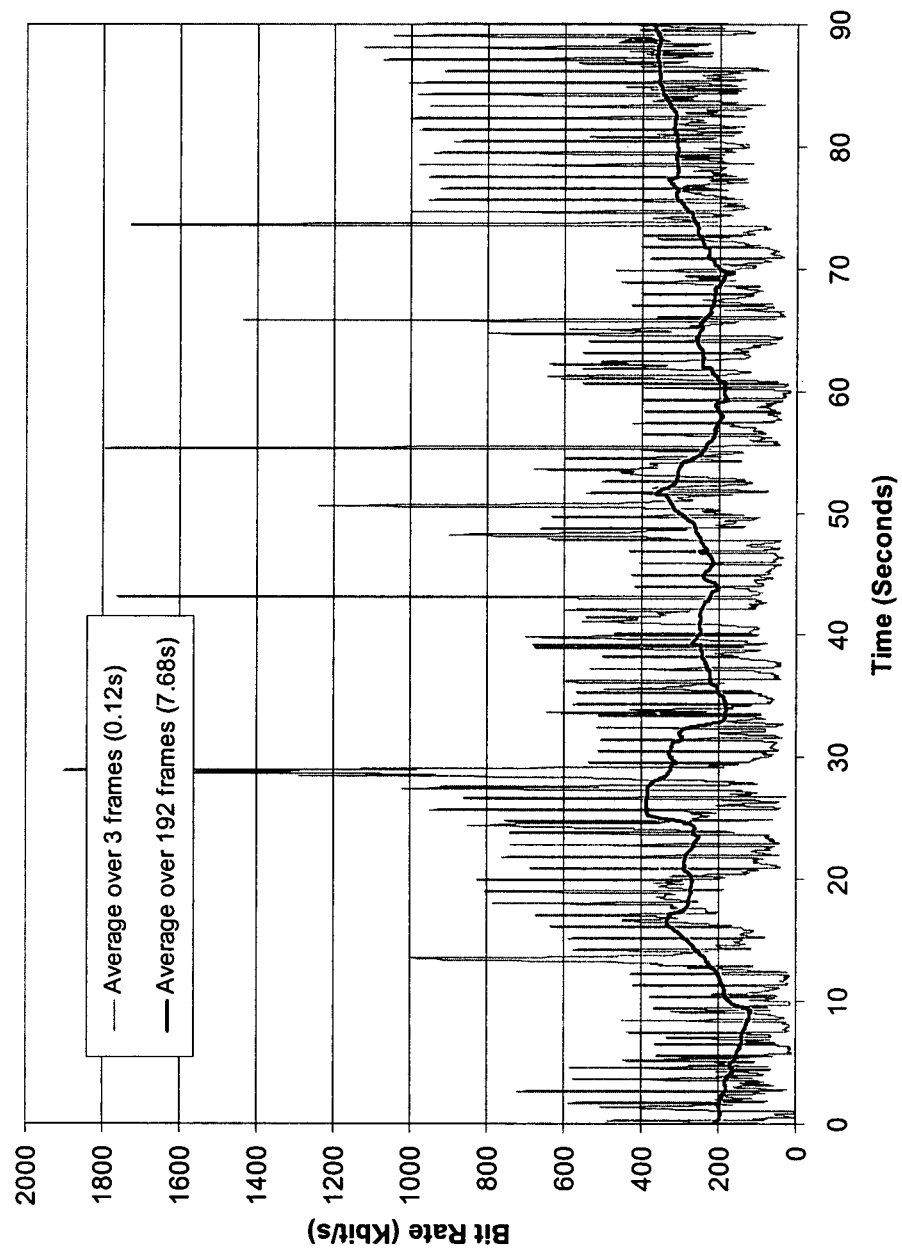
FIG. 1 is a graph showing the variation in bitrates used to encode a video sequence at a constant quality.

It is proposed that video streams transmitted over a contended piece of network are encoded at a constant quality rather than at a constant bitrate. If a video sequence is encoded at constant quality, then the bitrate used is likely to vary dramatically. FIG. 1 shows the bitrate over a 90 second video clip encoded at a constant quality level. In this example, the quality level has been determined by setting a quantiser parameter (qp) to 28. The quantiser parameter effectively controls the quality of the encoding—the smaller the quantiser, the better the quality. This clip is typical of many video sequences, with the bitrate varying depending on how complex the scene is at any given moment in time. For example, a sequence of frames where there is much movement or action usually requires a higher bitrate to encode at the same fixed quality.

The two different traces in FIG. 1 are for two different amounts of buffering. The more dynamic trace is where the bitrate is the average used over 3 frames, whereas the smoother trace is where a sliding window of 192 frames has been used. Thus, by increasing the amount of buffering, the bitrate is effectively smoothed.

The bitrate for any practical streaming system will vary considerably as a function of the difficulty of encoding the specific sequence of content as described above. This variation is even more apparent when comparing different genres of video clips. For example, sports clips might require a higher average bitrate and fluctuate more due to the high activity of typical scenes, whereas a news report clip might require a much lower bitrate and be relatively static.

As such, to deliver video streams at a constant quality to users sharing a contended network, a constant bandwidth method is not efficient to use across all the streams. The bandwidth allocated to each stream must be allowed to dynamically vary in time in accordance with the precise demands of the video being streamed at that time and also be within any network bandwidth constraints.

Figure 2:
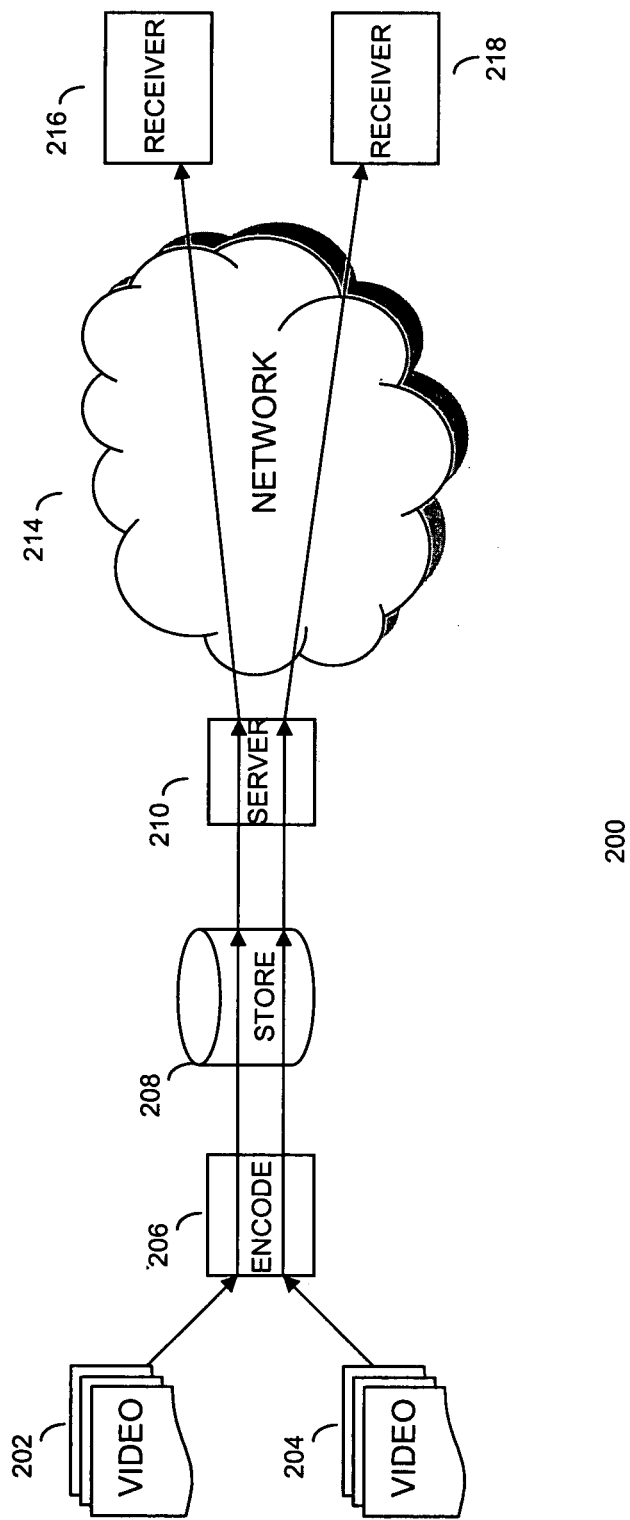
FIG. 2 is a network diagram of a system in an embodiment of the present invention.

FIG. 2 shows an example of a system 200 comprising a video encoder 206 connected to a video store 208, which is in turn connected to a server 210. The server 210 can communicate with each of two receivers, receiver_A 216 and receiver_B 218, over the IP network 214. The receivers 216 and 218 can make requests to the server 210 for video clips. The IP network 214 operates under a modified TCP arrangement which is described below in an embodiment of the present invention.

The encoder 206 encodes video sequences for transmission to the receivers 216 and 218. Here two video sequences are shown, sequence_A 202 and sequence_B 204. The encoder 206 can encode at various bitrates and outputs the encoded video sequences to the data store 208 or directly to the server 210. The data store 208 is used to store encoded video sequences until they are requested or needed by the server 210. The server 210 retrieves the encoded video sequences from the data store 208 or directly from the encoder 206, and transmits them as video streams over the IP network 214 to either of the two receivers 216 and 218. Sequence_A 202 is requested and will be transmitted (after encoding) to receiver_A 216, and sequence_B 204 is requested and will be transmitted to receiver_B 218. The receivers may be suitably configured computers or set top boxes for example, and are adapted to decode the received video stream and decode the encoded sequences into the original video for viewing by a user.

When congestion occurs in the IP network 214, it is handled using a modified network control mechanism. In this example, the standard TCP protocol is modified to handle the congestion. Specifically, the dynamics of the congestion control algorithm built into TCP is modified so that the fraction of bandwidth that is allocated to any video stream over the IP network 214 at a given point in time is a function of the bandwidth requirements of that content. Thus more complex video sequences, such as sports sequences, should be given more bandwidth than less complex sequences such as news report clips. At the same time, the video streams transmitted over the IP network 214 are modified so that they are transmitted at the maximum bitrate allowed by the congestion control mechanism.

Currently under TCP, congestion control is effected using a sliding window mechanism. The length of the sliding window determines how much data is sent before requiring an acknowledgement. The bitrate is a function of the size of this window as well as the round trip time (time between sending data and an acknowledgement being received). To ensure that more complex video sequences gets a larger share of the bandwidth, the dynamics of the congestion control algorithm are altered such that the more difficult or complex content has a larger sliding window. In effect, the 'greediness' of TCP is modified.

A number of methods can be used to alter the 'greediness' of TCP. One method is by modifying the backoff factor. Normally, TCP will halve the size of the sliding window (the backoff factor) associated with the stream in question when packet loss occurs (it is assumed that packet loss is caused by congestion). In one embodiment of the present invention, we can adjust this backoff factor, so that the window size is set to, for example, three quarters of its original size when packet loss is detected. The effect would be that the affected stream will be 'greedier' than normal and secure a larger bandwidth compared with the situation when the back-off factor was half. The stream being transmitted on this greedy TCP session can then be transmitted at a higher level of quality than would be possible if the TCP session were not greedy.

Such a system, known as MulTCP, has been described by Crowcroft and Oechslin (J. Crowcroft and P. Oechslin, "Differentiated end-to-end Internet services using a weighted proportional fair sharing TCP". In ACM SIGCOMM Computer Communication Review archive, volume 28, pages 53-69, July 1998). MulTCP differs from traditional TCP in that it takes a parameter N which allows a stream to obtain a fraction of the available bandwidth that is equal to N times that of a single stream of traditional TCP. The standard congestion control mechanism of traditional TCP is the Additive Increase Multiplicative Decrease (AIMD) algorithm which is modified in MulTCP to emulate the behaviour of N TCP flows. The value of N can be non-integer: a value of 1.5 would result in a flow that was 50% more aggressive than a single flow An alternative system known as "ECN skipping" described in our co-pending European patent application (Agent's ref. A31751 filed on the same day as the present application and entitled "Data Transmission") could be used as an alternative to such a system as MulTCP. Explicit Congestion Notification (ECN) (K. Ramakrishnan, S. Floyd, D. Black, "The Addition of Explicit Congestion Notification (ECN) to IP", IETF RFC21368, September 2001) is a protocol that allows endpoints to be informed about congestion through the use of packet marking rather than by packet drops. Routers equipped with active queue management are able to mark IP headers signalling congestion to the endpoints prior to buffers overflowing and consequential packet loss. There is little need for retransmissions (under ideal conditions) which gives rise to an improved overall throughput. In a conventional implementation of ECN, some packets in the forward path would be marked when congestion occurs, and this marking would be echoed back to the transmitter in backward path packets. The transmitter would, on receipt of such echoes, adapt the TCP parameters in the same way as it would in the case of packet loss, and reduce its transmission rate. In the "ECN skipping" scheme, the receiver does not echo all congestion markings back to the transmitter, but echoes a fraction of them, in accordance with an aggression factor. The sender, by receiving less echoed markings, reduces its transmission rate less frequently than a conventional ECN sender, and consequently obtains a larger share of the network bandwidth.

MulTCP and "ECN skipping" are two examples of transport protocol modification that allow transmission paths to obtain unequal shares of the available bandwidth, allowing a bandwidth N times that of an unmodified transport protocol. Other techniques having similar control properties could be employed instead. Both techniques have been shown to be able to obtain up to about three or four times the bit rate of a conventional transport protocol stably and consistently; they can also be configured with N a little below 1 to get less bit rate than a conventional transport protocol. Each specific transport protocol has a different range of N over which it can operate effectively. We aim to operate the transport protocol within this range as much as possible.

In the following we describe how, by encoding a test set of video sequences at a fixed reference quality level and calculating the "downstairs" delivery schedule (to be explained below) required for timely delivery of the encoded data, we determine a suitable reference bit rate that can be used to normalise required bit rate values so that the bandwidth allocation factor N will be in the optimal range of the transport protocol for the majority of video content. For simplicity we assume in this description that the optimal range of N is between 1 and 4, although in practice this will vary with the transport protocol that is used.

A video sequence that has been encoded at variable bit rate can be delivered over a network at piecewise constant bit rate, with the rate of each piece decreasing monotonically. This is believed to have first been noted by Professor Mohammed Ghanbari. He referred to the resulting bit rate profile as a "downstairs" function.

According to our international patent application (Ghanbari and Sun), published as WO2004/047455, delivery of variable bit-rate video can usefully be analysed as follows:

Consider, at a receiver, some arbitrary time segment (but equal to a whole number of frame periods), extending from time $t_g$ at which the decoder begins to decode frame g to time $t_h$ at which the decoder begins to decode frame h. The duration of this segment is that of h-g frame periods, that is, $t_h$-$t_g$. Suppose, further, that the transmission rate during this segment is A bits/frame period.

At time $t_g$, the receiver must have already received the bits for all frames up to and including frame g, i.e.

$$\sum_{j=0}^{g} d_j \text{ bits}$$

where $d_j$ is the number of coded bits generated by the encoder for frame j.

Suppose however that the receiver has, prior to time $t_g$, also received p additional bits, that is, in total, $$\sum_{j=0}^{g} d_j + p \text{ bits.}$$

At any time $t_k$ ($t_g \le t_k \le t_h$), at which the receiver begins to decode frame k, the receiver has also received (k-g)A bits, so:

$$\text{Total bits received at time } t_k = \sum_{j=0}^{g} d_j + p + (k-g)A. \qquad [1]$$

At this point, the receiver needs to have all the bits for frames up to and including frame k, that is:

$$\text{Total bits needed at time } t_k = \sum_{j=0}^{k} d_j. \quad [2]$$

Since the number of bits received must be at least equal to the number needed, the condition that needs to be satisfied to avoid buffer underflow is $$\sum_{j=0}^{g} d_j + p + (k-g)A \geq \sum_{j=0}^{k} d_j \quad [3]$$

Or $$p + (k-g)A \geq \sum_{j=g+1}^{k} d_j \quad [4]$$

If this is to be achieved without the transmission of preload bits p, this requires that $$(k-g)A \geq \sum_{j=g+1}^{k} d_j \quad [5]$$

Or, $$A \geq \frac{1}{(k-g)} \sum_{j=g+1}^{k} d_j. \quad [6]$$

Thus, the transmitted rate A must be greater than or equal to the average generated bits per frame over frames g+1 to k, for any value of k (g+1≤k≤h), which will be achieved if $$A \geq \underset{k=g+1}{\overset{h}{\text{Max}}} \left\{ \frac{1}{(k-g)} \sum_{j=g+1}^{k} d_j \right\}. \quad [7]$$

Use of this rate means that the number of bits (h-g)A transmitted during the segment will exceed the number of bits generated for the segment, unless the maximum occurs for k=h, that is, at the end of the segment. On the premise that the continued use of the transmission rate thus calculated, after the maximum has passed, seems to represent the use of a rate higher than absolutely necessary, Ghanbari aimed to partition the data to be transmitted into segments in such a manner that these maxima always occurred at the end of a segment. In the patent application, this situation was visualised graphically by plotting, for each segment, average bit rate (over the relevant period g to k) against time. He also preferred to choose the length of each segment so that it extended up to the largest of the remaining maxima. In consequence, a graph of the needed bit rates against time appear as a decreasing staircase shape and is sometimes referred to as a "downstairs" function.

Alam, Khan and Ghanbari have observed that the positions in time at which changes to the downstairs bit rate occur are about the same when a video sequence is encoded multiple times at different levels of quality ("Multiple Bitstream Switching for Video Streaming in Monotonically Decreasing Rate Schedulers," F. Alam, E. Khan, and M. Ghanbari, IEEE International Conference on Industrial Technology, 2006 (ICIT 2006), 15-17 Dec. 2006, pp. 973-978).

In order to set the value of N in an aggressive transport protocol, we hypothesize that the downstairs bit rate of a segment of a sequence of video encoded at a given perceptual quality can be approximated by a function that is separable into the product of a function of the content of the uncompressed video, and a function of the perceptual quality of the encoded video, thus, $$b_i(q) = f_i \cdot g(q) \quad [8]$$

where $b_i(q)$ is the bit rate required to encode video stream i at perceived quality q, $f_i$ is a function of the content of the uncompressed stream i, a measure of the encoding difficulty of the content within that stream, and g(q) is an invertible function of q, but which is independent of the content to be coded.

We suppose that the bit rate on a contended network is now allocated in proportion to $f_i$, the encoding difficulty of the $i^{th}$ stream, as in $$b_i(q) = \left( \frac{f_i}{\sum_j f_j} \right) \cdot B. \quad [9]$$

where B is the bit rate of the contended channel. Then by substituting [9] back into [8], we get equation [10] which shows us that such an allocation results in a quality q that is independent of the parameters of the stream i, and hence, if that allocation were used for all streams, then all streams would get the same quality.

$$q = g^{-1} \left( \frac{B}{\sum_j f_j} \right) \quad [10]$$

If we evaluate [8] at a reference quality q=3.4 for each stream i, we have a candidate for $f_i$ as shown in [11]

$$f_i = \frac{b_i(3.4)}{g(3.4)} \quad [11]$$

Importantly this shows the ratio between different $f_i$ will be the same as the ratio between the bit rates at the reference quality $b_i(3.4)$. Hence, if we use an aggressive transport protocol for each video stream and set the respective values of N, $N_i$, in proportion to $f_i$, and therefore also in proportion to the encoded bit rate at the reference quality $b_i(3.4)$, the bandwidth each video stream would receive would be in proportion to this factor. And then from equation [10] we see that this will result in the same video quality being delivered for each video stream.

FIG. 5 shows the downstairs rate curve for a video sequence coded three times at the different fixed quality levels of 2.6, 3.4 and 4.2. As expected, it can be seen that the downstairs bit rate decreases with time. As encoding had been done with constant quality, from equation [8] it can be seen that $f_i$ is also decreasing in time, in proportion to the downstairs bit rate.

If we substitute equation [11] into equation [8], and rearrange, we get $$\frac{b_i(q)}{b_i(3.4)} = \frac{g(q)}{g(3.4)} \quad [12]$$

For a given quality q, this states that the ratio of the bit rate required at quality q to the bit rate required at the reference quality, 3.4 in this case, is constant, and hence independent of $f_i$, that is, independent of the difficulty of encoding the video content.

FIG. 6 illustrates the validity of this. It shows the ratio of the downstairs bit rates at qualities of 2.6 and 4.2 compared with the downstairs bit rates at quality 3.4, showing that these ratios are mostly constant over the sequence.

We selected a test set of 32 video sequences, with durations ranging from 30 minutes to two hours, and representing a wide range of video content genres from action and drama movies to television drama, news and sport to children's television and user generated content. We encoded this test set of video sequences using MPEG-4 AVC, but could have used any other suitably configured video codec. The encoder was configured to encode with a fixed group of pictures structure, with regular encoding of Intra frames, to support random access into the encoded bitstream. The encoder was configured to encode with fixed perceptual quality, as described in our co-pending European patent application no. 0825081.5 (Agent's ref. A31594), although any other method of achieving constant or near constant perceptual quality, such as coding with fixed quantisation parameters, could have been used. We set the fixed quality level to a reference level, equal to 3.4 on the scale defined in BT.500.11 ("Methodology for the subjective assessment of the quality of television pictures", International Telecommunications Union (ITU-R) Recommendation BT.500-11, 2002).

Then we calculated the downstairs curves for each of these encoded video sequences, and from these determined the downstairs bit rates and the durations for which these applied, $A_i$ and $k_i$. We created a list, in which each entry consists of the downstairs bit rate of one video segment, $A_i$, and the duration of that video segment, $k_i$. All segments of all video sequences in the test set are included in this list. The list is then sorted from lowest rate to highest rate. Then for each rate, starting at the lowest, the total amount of time, calculated as the sum of the duration elements in the sorted list, is calculated for elements in the list whose downstairs bit rate is between that of the current element and four times that value. We determined the maximum of these sums, and recorded the downstairs bit rate associated with this maximum, which we term the reference quality reference downstairs bit rate, $R_{ref}$.

In general, when downstairs rates are normalised by this reference rate to get values of N, an optimal number will occur within the effective operating range of the transport protocol, N=1 to 4 in this specific example, but some may be outside of this range. The best course of action may depend on the characteristics of the actual transport protocol in use: it make be best to clip values outside of this optimal range to the limiting values of the range (1 and 4 in this example), or it may be best to operate with the actual value of N.

The method will now be described in more detail with reference to the system 200 of FIG. 2.

The encoder 206 is provided with two different video sequences, sequence_A 202 and sequence_B 204. Each video sequence represents a different video clip. In this example, sequence_A 202 is of a sports clip such as a football match, and sequence_A is a news report clip. Both sequence_A 202 and sequence_B 204 are fed into video encoder 206. The video encoder 206 takes each video sequence and encodes it. The encoding used is MPEG-4 AVC, but could be any other suitably configured video codec.

Each video sequence is encoded at 3 different fixed quality levels, one of which is the reference quality as above. The downstairs curve for each video sequence is calculated from the encoding at the reference quality. The downstairs bit rate associated with each encoded segment is recorded. Although we prefer to encode all three quality levels in advance, this is not strictly necessary; it is however necessary to record the downstairs bit rates for the reference quality sequence and therefore this needs to be encoded in advance or at least analysed sufficiently ahead of the transmission that the downstairs rates can be determined.

Figure 3:
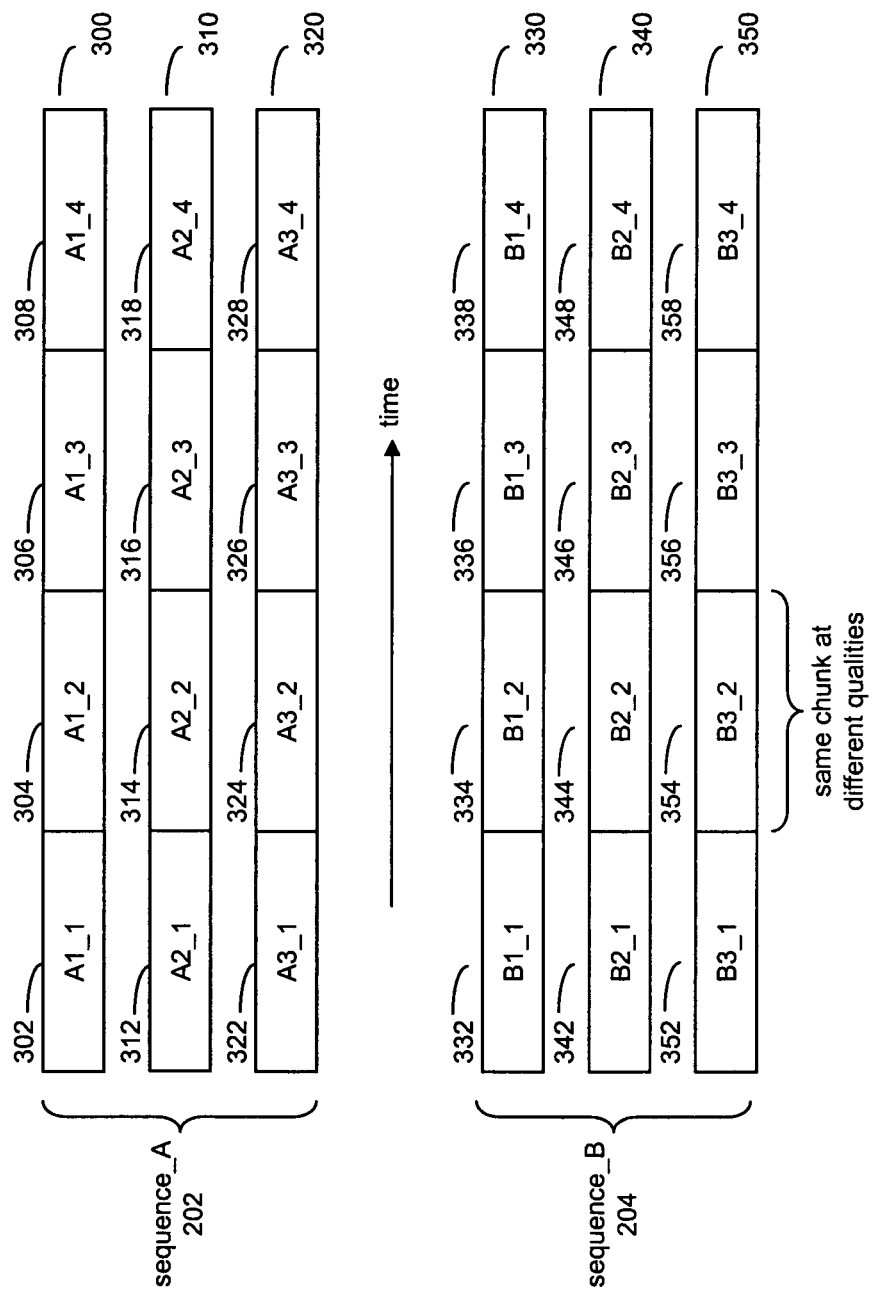
FIG. 3 is a diagram showing two different video clips encoded at three quality levels.

Of course, each video clip may be encoded at fewer or more quality levels. In this example, each of the two encoded sequences, at each encoded quality level, comprise four encoded chunks. This is shown in more detail in FIG. 3. A chunk represents an independently encoded portion of video. Switching between the transmission of one quality level and another quality level is possible at chunk boundaries without degrading the received pictures. In the preferred embodiment, a chunk is a group of pictures (as defined in the MPEG standard) of duration about one second (e.g. 24 frames for a 25 Hz video source), starting with an Intra frame: in a video sequence of duration one hour, there would be about 3750 chunks. Note that FIG. 3 is diagrammatic; the chunks may all be of the same length within a particular sequence A, or as between sequence A and sequence B. In general the intersegment boundaries of Sequence B will not be simultaneous with those of sequence A.

FIG. 3 shows video sequence_A 202 encoded into three separate encoded video sequences: encoded video sequence_A1 300, sequence_A2 310 and sequence_A3 320. Encoded video sequence_A1 302 is encoded at a first and highest quality. Encoded video sequence_A2 310 is encoded at a second, medium quality. Encoded video sequences_A3 320 is encoded at a third and lowest quality.

Each of the encoded video sequences 300, 310 and 320 is divided into four individual chunks, where the start of each chunk corresponds to the same point in the un-encoded video sequence_A 202. Thus, the start of chunk A1_2 304 corresponds to the start of chunk A2_2 314 and also A3_2 324, but where the chunks are encoded at different quality levels.

Also shown in FIG. 3 are the encoded sequences of video sequence_B 204 comprising encoded sequence_B1 330, sequence_B2 340 and sequence_B3 350. The three encoded sequences are each encoded at the same quality levels used for sequence_A 202. Thus, sequence_B1 330 is encoded at the same highest quality level as sequence_A1 300. Sequence_B2 340 is encoded at the same medium quality level as sequence_A2 310. Sequence_B3 350 is encoded at the same low quality level as sequence_A3 320.

Thus, the encoder generates encoded video sequences at three quality levels for both the video streams (to give six encoded streams), which are then sent to the data store 208. The data store 208 stores these until they are needed.

The server 210 now receives a request from the receiver_A 216 for the video sequence_A 202, and also a request from receiver_B 218 for the video sequence_B 204. The server 210 retrieves the corresponding encoded video sequences from the data store 208. Alternatively, the encoded sequences may be generated dynamically by the encoder 206 and sent directly to the server 210.

The server 210 retrieves the downstairs bit rate, $A_i$, associated with the first chunk of the video sequence_A 202, as calculated from the encoding at the reference quality level. It then calculates a value of N, $N_i$, as:

$$N_i = \frac{A_i}{R_{ref}} \quad [13]$$

and configures the transport protocol for the transport of video sequence_A 202 with this value of $N_i$. Similarly, the server 210 calculates and sets the value of N for the transport protocol for the transport of video sequence_B 204 using the downstairs data for the encoding of that sequence at the reference quality level. This value of N will be sent to the MuITCP control software which is be located inside the server 210. In the case of MuITCP, the server N will need to know the value of N. In the case of ECN skipping, the receiver will need to know the value of N. It could be told this at the start of the streaming session or could be told the current value of N from time to time during the session, including for example, when it changes (being told all values at the start is our current preference).

Some observations about the constant of proportionality $1/R_{ref}$ are in order here. Firstly, the constant used should preferably be the same or similar for both (or, in the general case, all) video sources on the same network. Secondly, if the network is used only for video managed in this manner, the absolute value of $1/R_{ref}$ is not very critical in the sense that variations will not change the picture quality provided that it keeps the value of N within the range (as discussed above) that the network control mechanisms can handle. If the network is shared with other traffic, on the other hand, it is desirable to avoid low values of N (e.g. by selecting a lower value for the reference rate) since values below unity will effectively give precedence to the other traffic in allocation of bandwidth.

In this embodiment of the invention, the same reference quality (q=3.4) is used for both (all) streams. Assuming that all streams are to have the same quality, this is the most convenient way to proceed. In principle, however, this is not essential. If two streams have their downstairs rates determined at different reference quality levels q1 and q2, then equal quality can be achieved if the difference (corresponding to a factor g(q1)/g(q1) is corrected for, for example by estimation of this ratio from training data or by separate determination, at the respective reference rate, of a respective value of $R_{ref}$. Alternatively, it would be possible to deliberately use differing reference quality levels to provide for differing quality between streams in order to provide differing quality levels (standard, premium, etc.). If two streams use reference quality levels of 3.0 and 3.4 respectively one would expect the latter stream to have an allocation of bandwidth so that the quality achieved by the second stream was on average 0.4 units better.

Initially, the server 210 uses the lowest quality encoded sequences, sequence_A3 320 and sequence_B3 350. The server 210 can use any of the other sequences as well, depending on what bandwidth the server 210 thinks the IP network 214 has available. If the network 214 handles these streams comfortably and indicates that there is further bandwidth available, perhaps by advertising a buffer overflow in the buffers of the receivers (which might also indicate that the receiver is not capable of consuming the data quickly enough), then the server 210 switches both encoded sequences over to the next higher quality sequence (at a chunk boundary to ensure continuity of the video sequence).

As the server 210 delivers data representing the video sequence 202, it retrieves the downstairs bit rate calculated for the encoding of this video sequence at the reference quality for the chunk about to be delivered. When the downstairs bit rate for this chunk is different from that for the immediately previously transmitted chunk, it calculates a new value of $N_i$ for the transmission of the video sequence according to [13] and configures the transport protocol with the new value of N.

Similarly, the server 210 performs the same operations as it delivers data representing the video sequence 204, using downstairs bit rates calculated for the encoding of video sequence 204 at the reference quality.

Note that although the transmission of video sequences 202 and 204 may have started at the same time, the number of chunks of each sequence that have been transmitted at some subsequent time may not be equal.

When the IP network 214 becomes congested, the bandwidth made available to the server 210 for streaming the encoded video sequences must be reduced. The use of an aggressive transport protocol, configured with a value of N appropriate to the relative demands of the video sequences, enables the available network bandwidth to be shared, not necessarily equally, but such that nearly equal quality can be delivered for each video sequence.

The server 210, or the receivers 216 and 218, monitor the transmission rate that has been achieved through the network, and the amount of data that has been delivered and the amount that has been decoded and displayed, and select appropriate video quality levels to be transmitted, using a suitable selection mechanism such as that described in our co-pending European patent application no. 08253946.1 (Agent's ref. A31750), so that if the current network transmission bit rate were sustained, video data would be delivered in time for continuous decoding and display, without stalling.

The result is that the system provides equitable quality video streaming across multiple video sequences, so that each video sequence is delivered at an equal quality level to every other stream, even when experiencing congestion.

When the network is being fully utilised, the sum of the bitrates of the chunks being delivered at any point in time (e.g. A1_2 and B1_2 when both streams are at highest quality, perhaps when there is no congestion, or A2_4 and B2_4 when both streams are at medium quality, perhaps when slight congestion occurs) will be equal to the network capacity. By altering the TCP dynamics to ensure that each stream gets a proportion of the bandwidth that it needs for a given quality, then the chunks being delivered at any moment in time will all be of similar quality, even though they may require very different bandwidths.

Figure 4:
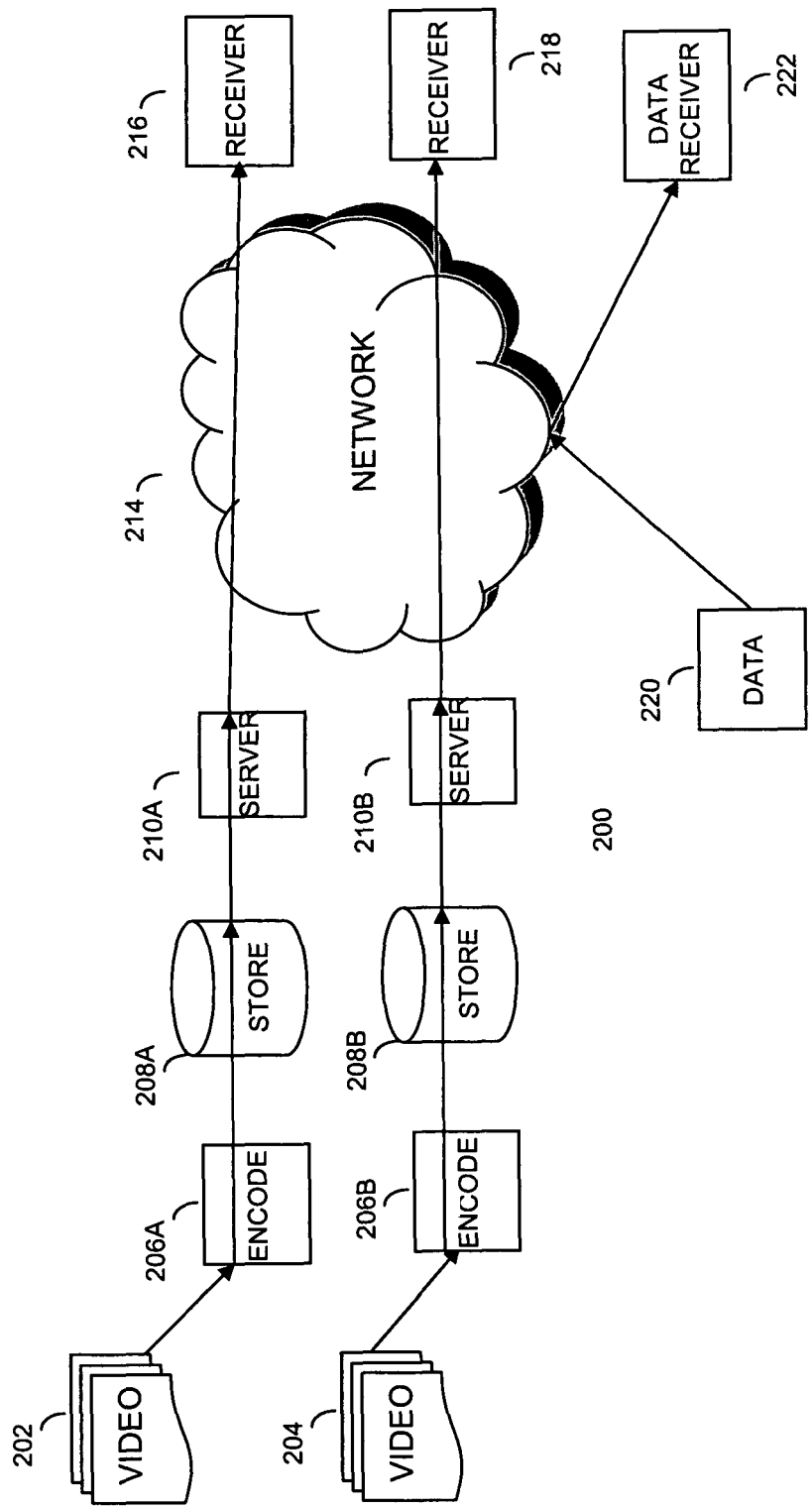
FIG. 4 is a network diagram of a system in a second embodiment of the present invention.

FIG. 4 is a network diagram of a system in a second embodiment of the present invention; This is like that of FIG. 2 but with two independent encoders and servers: each of the video sources 202 and 204 is connected to a respective encoder 206A, 206B, each connected to its own video store 208A, 208B which is in turn connected to its server 210A, 210B. Each server 210A, 210B can communicate with one of the two receivers, receiver_A 216 and receiver_B 218, over the IP network 214.

It will be understood that, on a dedicated network, all the traffic may be video streaming managed in the manner described above. Alternatively, the network may be one which also carries other types of traffic, as illustrated by the data source 220 and data receiver 222 in FIG. 4.

It will be seen that the methods we have described control the transmission of multiple video streams over a congested network so that each stream receives an equitable share of the bandwidth dependent on the quality of the encoding. Note that, although the above example uses the "downstairs" bit rate $A_i$, other measures of picture complexity can be used instead, such as the "downstairs" bit rate evaluated over a limited time window, the instantaneous needed bit rate, or a smoothed version of the latter.

The invention claimed is:

1. A method of transmitting a video sequence at a selectable quality from a server over a network, using a network control protocol operable in response to a control parameter to allocate to the server a share of available transmission capacity in proportion to the value of the control parameter, comprising:
    (a) performing pre-processing of the video sequence to be transmitted based on statistical analysis of video sequences encoded at an encoder in communication with the server, comprising:
        (a1) selecting a predetermined reference quality;
        (a2) determining a transmission rate value as the transmission rate needed for successful transmission of the video sequence at the selected reference quality; and
    (b) following said pre-processing of the video sequence, transmitting the video sequence, comprising:
        (b1) setting the control parameter proportional to the determined transmission rate value;
        (b2) providing the control parameter to the control protocol; and then
        (b3) transmitting the video sequence, encoded at a quality adapted in dependence upon the transmission capacity allocated to the server as a result of the provided control parameter.

2. A method according to claim 1 in which the transmission rate value is determined by
    (a) dividing the sequence into segments, wherein
        the first segment is a portion at the beginning of the sequence which has an average number of coded bits per frame which is greater than or equal to the average number of coded bits per frame of any shorter such portion, and wherein
        each succeeding segment is a portion immediately following the preceding segment which has an average number of coded bits per frame which is greater than or equal to the average number of coded bits per frame of any shorter such portion; and
    (b) determining a bit rate for each segment.

3. A method according to claim 2 wherein
    the first segment of the sequence is that portion at the beginning of the sequence which has an average number of coded bits per frame which is greater than or equal to the average number of coded bits per frame of any shorter such portion, and wherein
    each succeeding segment is that portion immediately following the preceding segment which has an average number of coded bits per frame which is greater than or equal to the average number of coded bits per frame of any possible such portion.

4. A method of transmitting a first video sequence and a second video sequence over a network in a temporally overlapping manner, comprising
    transmitting the first video sequence over the network using the method of claim 1; and
    transmitting the second video sequence over the network using the method of claim 1;
wherein the reference quality is the same for both sequences and ratio of the control parameter to the transmission rate value is the same for both sequences.

5. A method according to claim 1 in which
    the control parameter is the ratio of the respective transmission rate value to a reference transmission rate determined from a statistical analysis of training sequences encoded at the reference quality.

6. A computer system, comprising
    a computer processor, for transmitting a video sequence at a selectable quality over a network, using a network control protocol operable in response to a control parameter to allocate a share of available transmission capacity in proportion to the value of the control parameter, the computer system being configured to at least:
    (a) perform pre-processing of the video sequence to be transmitted based on statistical analysis of video sequences encoded at an encoder in communication with a server, comprising:
        (a1) selecting a predetermined reference quality;
        (a2) determining a transmission rate value as the transmission rate needed for successful transmission of the video sequence at the selected reference quality; and
    (b) following said pre-processing of the video sequence, transmit the video sequence, comprising:
        (b1) setting the control parameter proportional to the determined transmission rate value;
        (b2) providing the control parameter to the control protocol; and then
        (b3) transmitting the video sequence, encoded at a quality adapted in dependence upon the transmission capacity allocated as a result of the provided control parameter.

7. The computer system according to claim 6 in which
    the computer system is further configured, so that the transmission rate value is determined, to:
    (a) divide the sequence into segments, wherein the first segment is a portion at the beginning of the sequence which has an average number of coded bits per frame which is greater than or equal to the average number of coded bits per frame of any shorter such portion, and wherein
    each succeeding segment is a portion immediately following the preceding segment which has an average number of coded bits per frame which is greater than or equal to the average number of coded bits per frame of any shorter such portion; and
    (b) determine a bit rate for each segment.

8. The computer system according to claim 7 wherein
    the first segment of the sequence is that portion at the beginning of the sequence which has an average number of coded bits per frame which is greater than or equal to the average number of coded bits per frame of any shorter such portion, and wherein
    each succeeding segment is that portion immediately following the preceding segment which has an average number of coded bits per frame which is greater than or equal to the average number of coded bits per frame of any possible such portion.

9. The computer system of claim 6, wherein
    the computer system is further configured to:
    transmit a first video sequence over the network using steps (a)-(e); and
    transmit a second video sequence over the network using steps (a)-(e);

wherein the reference quality is the same for both sequences and ratio of the control parameter to the transmission rate value is the same for both sequences; and wherein the first video sequence and the second video sequence are transmitted over the network in a temporally overlapping manner.

10. The computer system according to claim 6 in which the control parameter is the ratio of the respective transmission rate value to a reference transmission rate determined from a statistical analysis of training sequences encoded at the reference quality.

\* \* \* \* \*